United States Patent [19]

Sprung

[11] Patent Number: 4,651,915
[45] Date of Patent: Mar. 24, 1987

[54] MOBILE PIPE MILL

[75] Inventor: Douglas L. Sprung, Camano Island, Wash.

[73] Assignee: Pipemakers, Inc., Calgary, Canada

[21] Appl. No.: 647,180

[22] Filed: Sep. 4, 1984

[51] Int. Cl.⁴ .............................................. B23K 9/12
[52] U.S. Cl. .......................................... 228/7; 228/9; 228/17.5; 180/9.46
[58] Field of Search ............... 228/7, 8, 9, 15.1, 17, 228/17.5; 180/9.1, 9.46; 280/81 R, 81.5, 81 B; 296/24 R; 219/8.5, 10.53, 59.1, 60 R, 61.2; 72/7, 174, 51, 245, 52, 247, 166, 170, 173, 177

[56] References Cited

U.S. PATENT DOCUMENTS

| | | | |
|---|---|---|---|
| 3,014,118 | 12/1961 | Vassar | 228/17.5 |
| 3,204,847 | 9/1965 | Vitense | 228/17 |
| 3,900,077 | 8/1975 | Gee et al. | 180/9.46 |
| 4,140,193 | 2/1979 | Miller | 180/9.46 |
| 4,142,237 | 2/1979 | Yamasaki | 228/104 |
| 4,433,952 | 2/1984 | Glickman | 180/9.46 |

FOREIGN PATENT DOCUMENTS 708026 1/1980 U.S.S.R. ............................. 180/9.46

Primary Examiner—M. Jordan
Attorney, Agent, or Firm—Kenyon & Kenyon

[57] ABSTRACT

An improved mobile pipe forming apparatus in which pipe forming apparatus is supported on a carriage. The carriage is mounted on a forward and a rearward pair of tracks, the two tracks of each pair being attached to each other by a rigid carbody, the carbody of one of these pairs of tracks being pivotally secured to the carriage by means of a ball and socket centered with respect to that carbody, the other carbody being secured to the carriage by means of a turntable which rotates above an axis normal to the surface of the carriage on a centered axis pin so that, during movement, the carriage stays on the same plane as that of the turntable. It is preferred that independent motors are provided for each track to power these motors. The motors are computer controlled. Other mechanical improvements over prior art mobile pipe forming apparatus are also described.

13 Claims, 16 Drawing Figures

MOBILE PIPE MILL

BACKGROUND OF THE INVENTION

The present invention relates to the manufacture of pipes, and more particularly to apparatus for the manufacturing of continuous lengths of metal pipe from a flat metal strip.

Stationary and mobile pipe forming devices for making a continuous length of metal pipe from flat metal strip material are well known in the prior art. See, for example, descriptions of mobile pipe forming mills in Vassar U.S. Pat. No. 3,014,118, issued Dec. 19, 1961; Sprung et al., U.S. Pat. No. 3,145,758, issued Aug. 25, 1964; Tsuyama, et al., Canadian Pat. No. 1,160,436 issued Jan. 17, 1984; Anderson Canadian Pat. No. 1,119,849, issued Mar. 16, 1982; and Ferreroele, Canadian Pat. No. 627,513, issued Sept. 19, 1961.

Because of their length, size and weight, there have been problems of manoeuvrability and weight in such prior art mobile line pipe mills particularly where a two vehicle apparatus, such as described and illustrated in Vassar U.S. Pat. No. 3,014,118, has been used. Such devices turn and back up often with great difficulty, and have trouble moving over uneven, spongy or muddy terrain such as in tundra or swamp areas.

Another problem arising from the very nature of such mobile pipe mills, is that the frames on which the mills are mounted must withstand torsional twisting while the mill is operating. This may be extremely difficult as the mill moves over rough and uneven terrain, and is further aggravated by the required length of such pipe mills, particularly where they are located on a single vehicle apparatus. If the frame twists as the mobile mill operates, the flat middle metal strap being passed through the mill for forming of metal pipe becomes mis-aligned with respect to the pipe forming and welding elements of the mill, making the continuous operation of the mill virtually impossible.

Prior references of general background interest relating to the motivation, steering and suspension of tracked vehicles are Canadian Pat. No. 748,330 of Nodwell et al, issued Dec. 13, 1966; No. 783,476 of Hand, issued Apr. 23, 1968; No. 793,172 of Messenger, issued Aug. 27, 1968 and No. 1,160,263 of Trask, issued Jan. 10, 1984.

It is an object of the present invention to provide a more manoeuvrable mobile pipe forming apparatus which may be self contained on a single carriage. It is a further object of the present invention to provide an improved suspension for the carriage for such a mobile pipe forming apparatus which enables the apparatus to be carried over uneven terrain with reduced torsional twisting of its carriage.

SUMMARY OF THE INVENTION

According to the present invention there is provided an improved mobile pipe forming apparatus of the type having in combination a carriage, means for propelling and means for steering the carriage, and pipe forming apparatus supported on the carriage, the pipe forming apparatus including a cradle for carrying a coil of an elongated metal strip, means for shaping the metal strip from the coil into an elongated cylindrical member with confronting, longitudinally extending edges, welding means to join the longitudinally extending edges of the cylindrical member to form a continuous pipe, and drive means to pass the strip from the coil through the shaping and welding means and pass the pipe from the pipe forming apparatus. The carriage is mounted on forward and rearward pairs of tracks. The two tracks of each pair are mounted on a rigid carbody, the carbody of the forward of tracks being pivotally secured to the carriage by means of a ball and socket means centered with respect to that carbody, the other carbody being secured to the carriage by means of a turntable which rotates about an axis normal to the surface of the carriage on a centered axis pin so that, during movement, the carriage stays in a plane parallel to that of the turntable. The top half of the turntable is attached to the carriage by means of a pin parallel to the surface of the carriage and normal to the longitudinal axis of the carriage, thereby allowing the associated carbody to rock backwards and forwards as well as to rotate.

In a preferred embodiment, the tracks are powered by independent DC motors, the speed and direction of rotation of each of the DC motors being controlled by computer means.

The mobile pipe forming apparatus according to the present invention permits relatively easy handling over rough terrain despite its size, with a minimum of torsion stress being exerted on the carriage. This feature significantly assists the forming and welding stages of the apparatus, in which, as previously indicated, the components must be precisely aligned during operation.

BRIEF DESCRIPTION OF THE DRAWINGS

These and other objects and advantages of the invention will become apparent upon reading the following detailed description and upon referring to the drawings in which.

Figure 1:
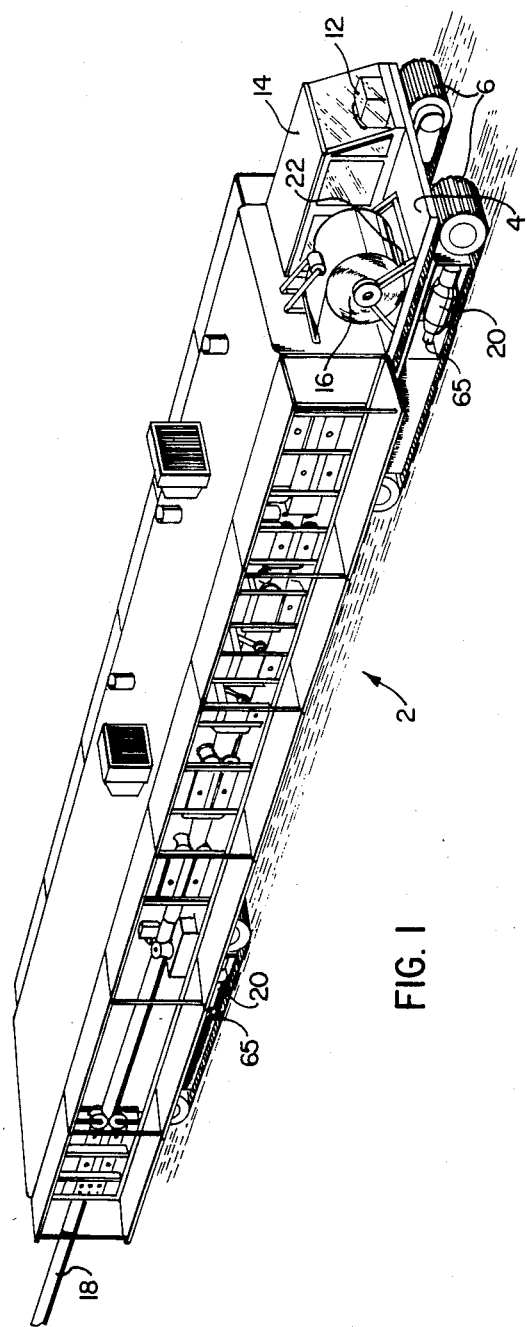
FIG. 1 is a perspective view of a mobile pipe forming apparatus according to the present invention.

While the invention will be described in conjunction with an example embodiment, it will be understood that it is not intended to limit the invention to such embodiment. On the contrary, it is intended to cover all alternatives, modifications and equivalents as may be included within the spirit and scope of the invention as defined by the appended claims.

DETAILED DESCRIPTION OF THE INVENTION

In the following description, similar features in the drawings have been given similar reference numerals.

Figure 3:
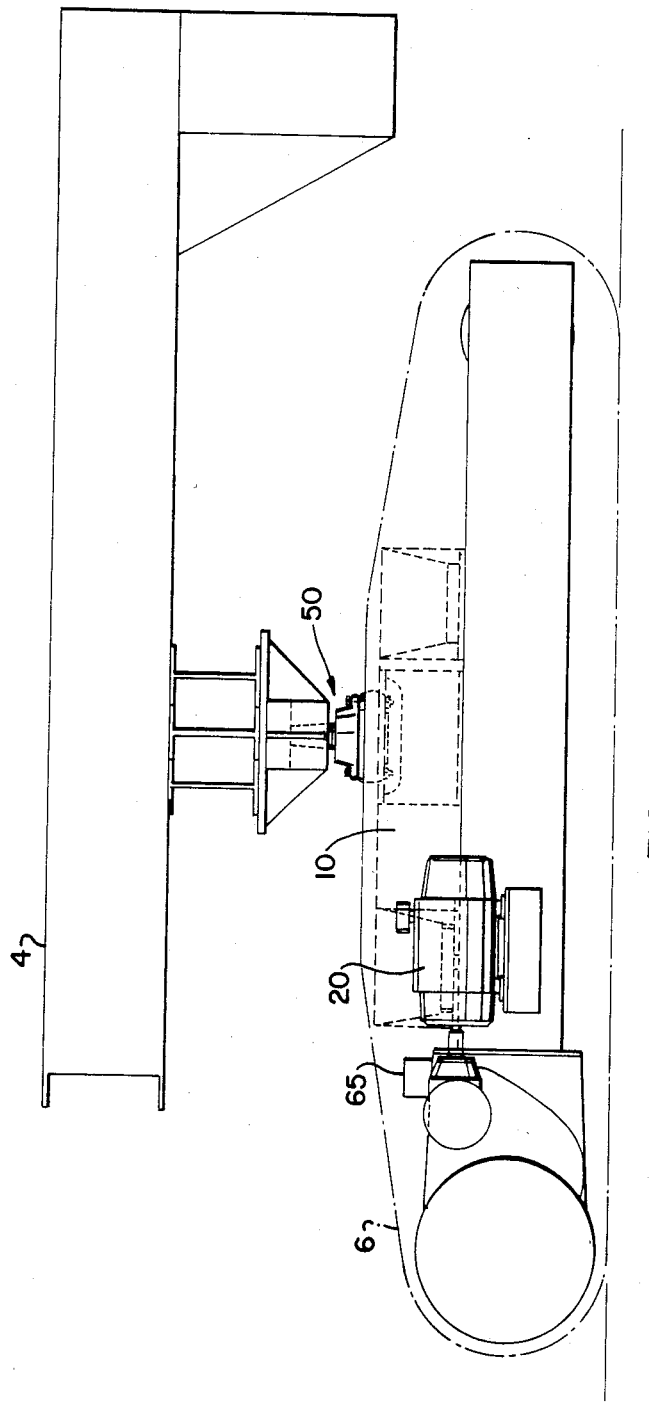
FIGS. 3 and 4 are enlarged schematic side and front views respectively, of the front tracks of the apparatus of FIG. 1.
Figure 4:
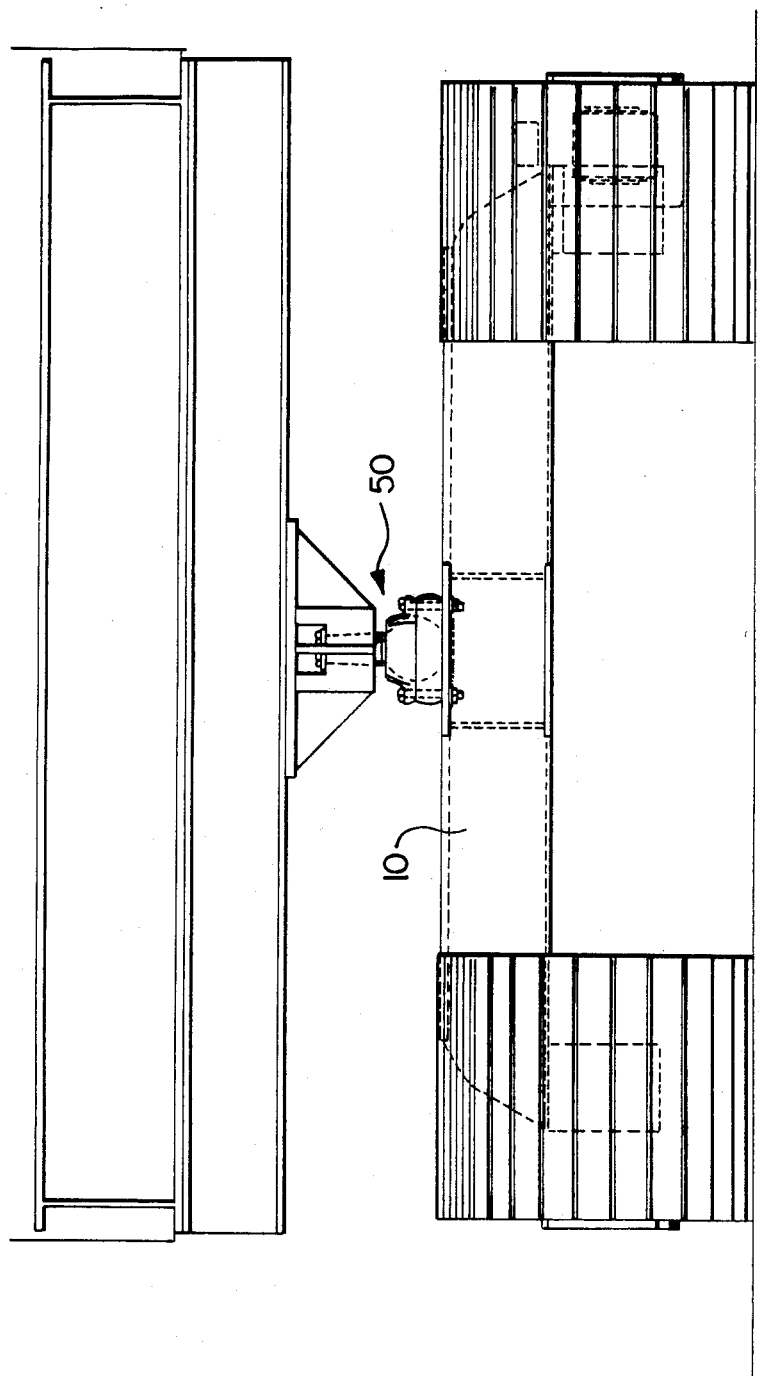
Figure 5:
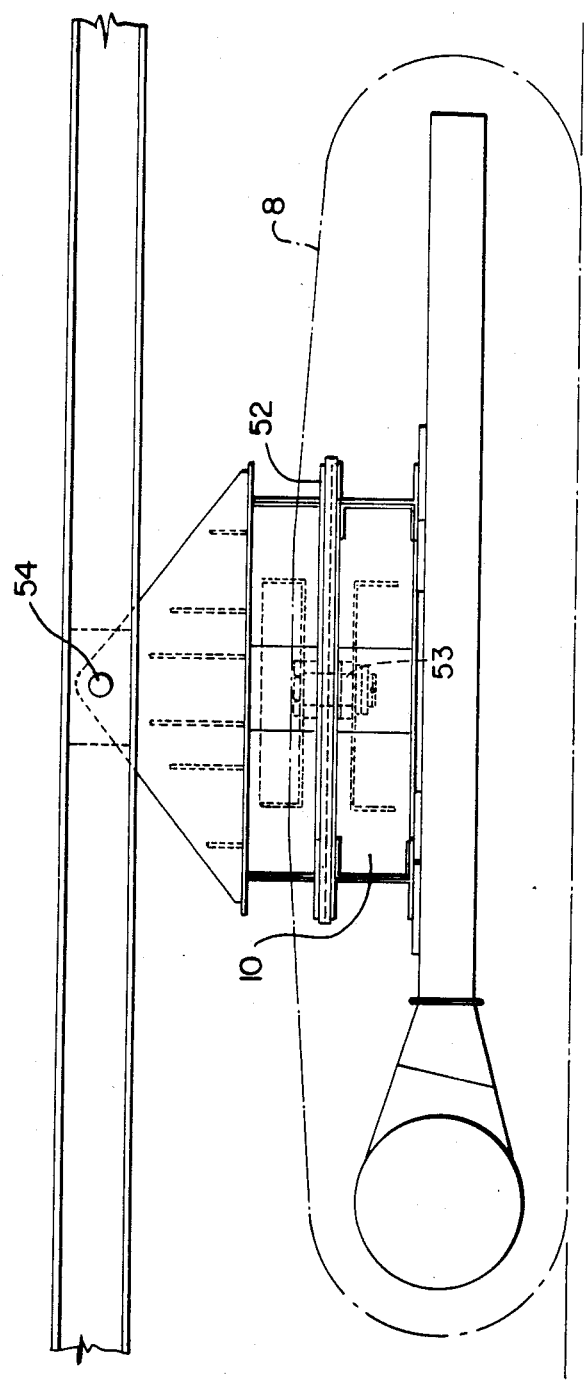
FIG. 5 is an enlarged schematic side view of the rear tracks of the apparatus of FIG. 1.

Turning to FIG. 1 there is illustrated a mobile pipe forming apparatus or mill 2 mounted generally on a carriage 4 which carriage itself is mounted on a pair on front tracks 6 and a pair of rear tracks 8. Each pair of tracks moves on a rigid carbody 10, (eg. FIGS. 3, 4, 5) the carbody in each case being centrally, pivotably secured to the underside of carriage 4 for rotation about a vertical axis in a horizontal plane to permit steering of the apparatus. An appropriate steering mechanism 12 is provided in cab 14 at the front of carriage 4.

Also at the front of carriage 4 is normally positioned a coil of flat strip metal material 16, mounted to feed from the coil as the coil rotates about a horizontal axis. Coil 16 is passed to metal forming apparatus on carriage 4, and leaves carriage 4 from the rear, in a continuous length metal pipe 18 during operation of the device which will be described in more detail hereinafter. Each of the tracks 6 and 8 are individually powered by means of appropriate motors 20, supplied with electrical tachometers and controllable by the operator in cab 14.

Figure 2:
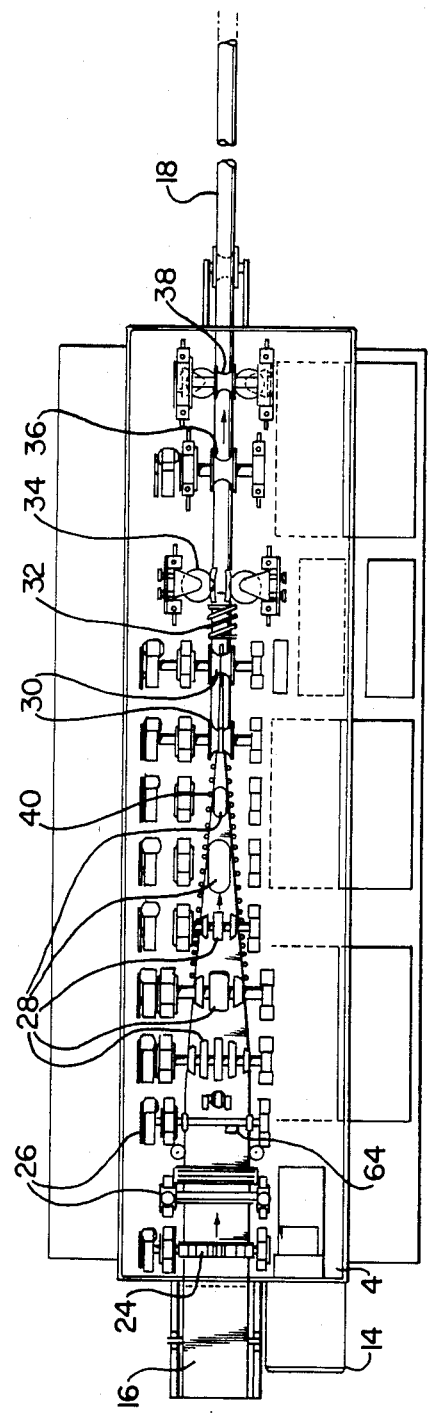
FIG. 2 is a schematic top plan view, from above, of the apparatus of FIG. 1.

As can be seen in FIG. 2, coiled metal strip 16, held in cradle 22, during operation is passed between pinch rolls 24 and then moved through rolls 26 where the longitudinal edges of the metal strip are sheared as required to provide proper size and a uniform edge; then through breakdown and forming rolls 28 where the edges of the metal strip 16 are upwardly curved and a generally U-shaped curved form is achieved; then passed to fin pass rolls 30 where the strip 16 is shaped into an elongated cylindrical member with confronting, slightly spaced, longitudinally extended edges; through induction welder 32, having a high or medium frequency, and weld rolls 34 where the longitudinally extending edges of the cylindrical member are joined to form a continuous pipe, through pull out and size rolls 36 and finally through Turk's head rolls 38 for sizing and straightening or bending, after which the continuous pipe line is passed from the rear of apparatus 2. Between the forming rolls 28 and fin pass rolls 30 are a series of laterally movable, hydraulically or mechanically actuated shoes 40 provided with bearing surfaces, for bearing against the moving metal strip material 16, which bearing surfaces are made from ultra high molecular plastic having low frictional characteristics. These shoes 40 bear against the metal strip from the sides and assist in bending it into its final cylindrical shape prior to welding.

Figure 14:
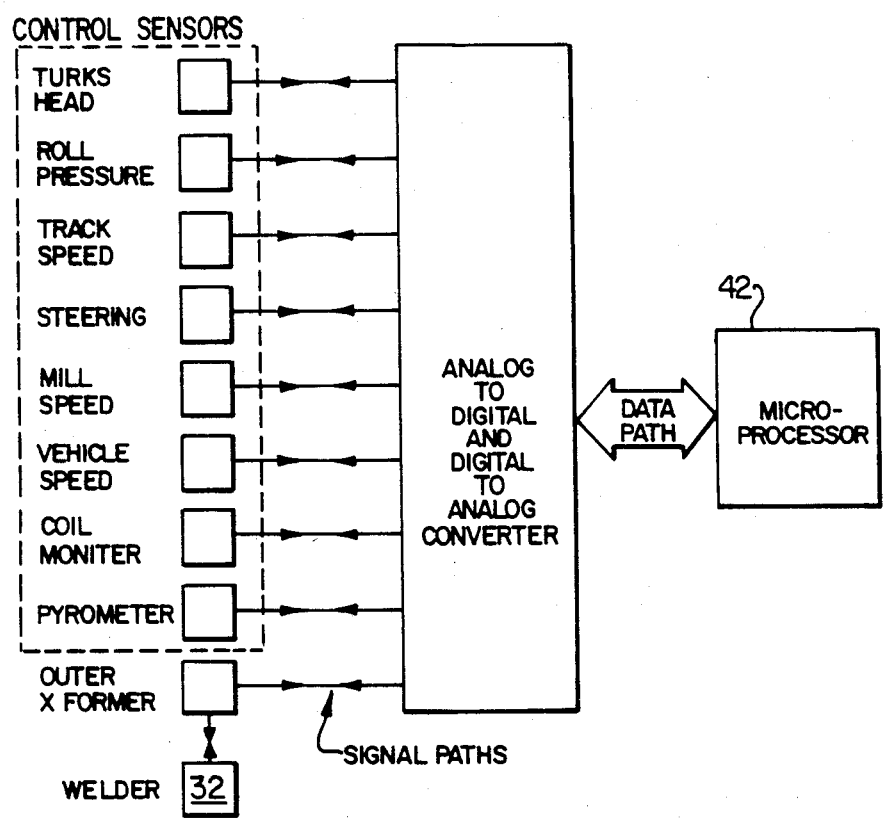
FIG. 14 is a schematic diagram illustrating computerized control of several of the features of the apparatus of FIG. 1.

Provided in cab 14 or in any other suitable location is an appropriate microcomputer 42 (FIG. 11, FIG. 14), which as will be described hereinafter, is set up and programmed to control many of the functions and operations of the pipe making apparatus or mill. These operations and functions are generally described in the schematic drawing of FIG. 14. In the preferred embodiment of the present invention, there are several aspects for computer control and/or monitoring for the mobile pipe mill. These include weld temperature monitoring and control, mill speed monitoring and control, vehicle speed monitoring and control, roll pressure monitoring and control, vehicle steering, Turk's head mechanism control and coil monitor. A separate microcomputer 42 may govern each of these aspects, or a single computer may be provided which monitors and controls them all. For each aspect, the computer can supply its monitoring and controlling function may times a second. If more than one computer is provided, each one of the computers can communicate to any other computer to signal the status of each aspect or feature which it monitors and controls. The computers could be arranged so that any other computer could take up the monitoring and control function if another one failed. The computerized monitoring and control of these various aspects of the mill operation are more fully described in my copending application Serial No.

Turning to FIGS. 3 and 4, there is illustrated respectively a side and front view of the front tracks 6 for carriage 4. As previously indicated, these tracks are mounted on a rigid carbody 10, the center of which carbody 10 (FIG. 4) being secured to the underpart of carriage 4 by means of a ball and socket arrangement 50. In this manner, a front carbody and tracks can pivot freely beneath the carbody in any direction, as long as the tracks and carbody do not contact other parts of the apparatus.

Rear tracks 8, on the other hand, are supported on rear carbody 10 which is secured by means of a turntable 52 to the lower part of the carriage 4 (FIG. 5). The top half of turntable 52 which rotates on a centered axis pin 53 is attached to carriage 4 by means of a horizontal pin 54 which is oriented at 90° to the longitudinal axis of the carriage 4, thereby allowing rear carbody 10 to rock to and fro about an axis through pin 54, as well as rotate on axis pin 53.

Figure 6:
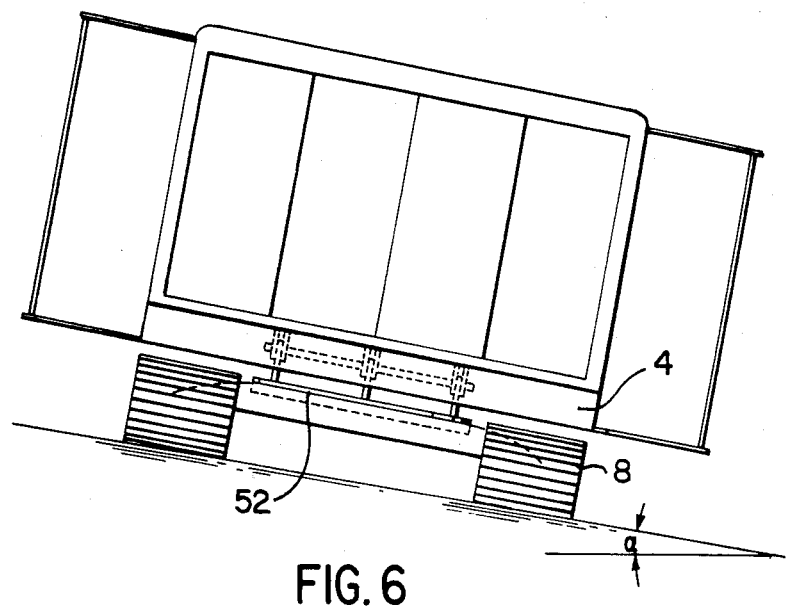
FIG. 6 is a rear elevation view of the apparatus of FIG. 1, the rear of the apparatus being on an inclined surface.
Figure 7:
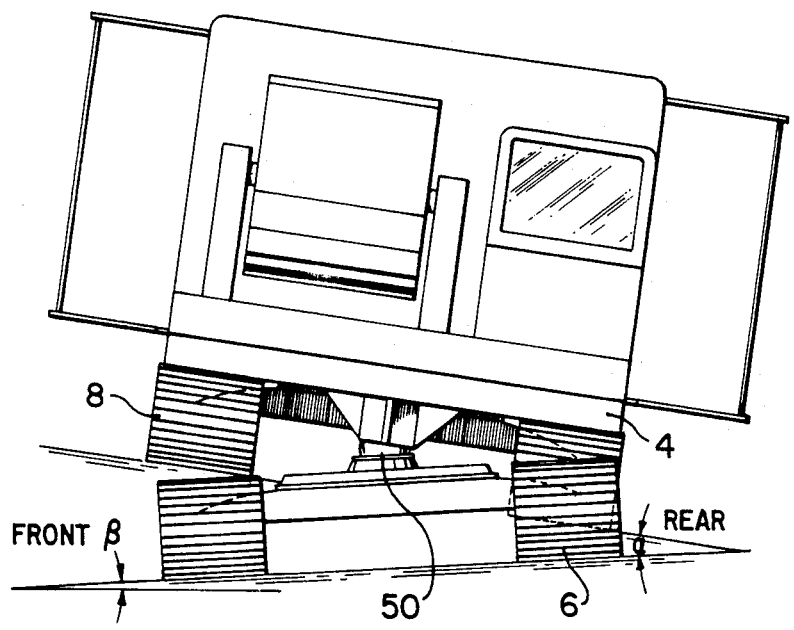
FIG. 7 is a front elevation view of the apparatus of FIG. 6, the front of the apparatus being on an oppositely inclined surface.

This three point suspension of carriage 4 which is thereby achieved allows apparatus 2 to be moved, while operating or otherwise, over uneven terrain without developing torsion stress on the carriage frame. As can be seen in the rear view of FIG. 6 and the front view of FIG. 7, of apparatus 2 moving over uneven terrain, the rear tracks 8, in moving over terrain which is angled at an angle $\alpha$ to the horizontal, through carbody 10 and turntable 52 produce an orientation of the plane of carriage 4 with respect to horizontal of $\alpha$ degrees (FIG. 6). As can be seen in FIG. 7, the terrain under front tracks 6 however is tilted $\beta$ degrees to the left and is, as well, somewhat lower than the terrain under the rear tracks 8. Nevertheless mill carriage 4 stays on the same plane as dictated by the rear tracks. The suspension as described herein permits all tracks to remain on the ground and yet no torsion to be exerted on the frame from the incline or horizontal tilt of the terrain. In other words the frame of carriage 4 and the rear carbody 10 are always in the same plane without external suspension stress. Thus, line-up distortion in the mill during operation, in the apparatus accordingly to the present invention, is significantly reduced over that which existed in prior art mobile pipe mills.

Figure 9:
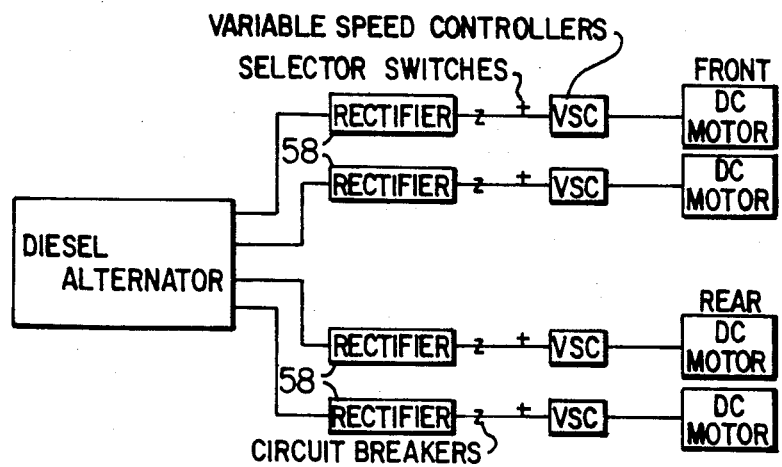
FIG. 9 is a circuit diagram for the motors driving the tracks of the apparatus of FIG. 1.

To move and steer carriage 4, each of the four tracks is driven by a DC motor 20 whose speed can be changed independently and whose direction of rotation is independent of the other three motors. A schematic example wiring diagram for these motors is illustrated in FIG. 9. Alternatively, the motors may be hydraulic. The motors are preferably individually controlled by means of computer 42. The computer can, by speeding up a track, cause the vehicle to be steered. When moving straight in one direction, all of the tracks can be controlled to alter the vehicle speed. The speed can be measured from the track motor or a tachometer 65, and the speed signaled to the computer.

Figure 8C:
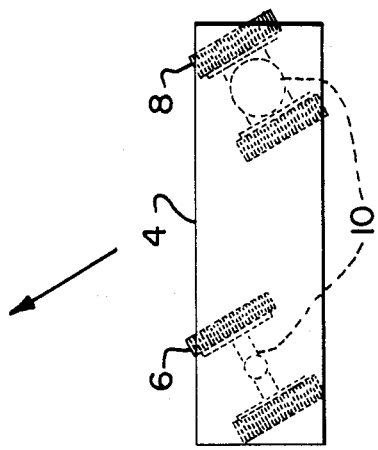
FIGS. 8a, 8b and 8c are a schematic plan view, from above, of the tracks of the apparatus of FIG. 1 illustrating various possible track orientations.
Figure 8B:
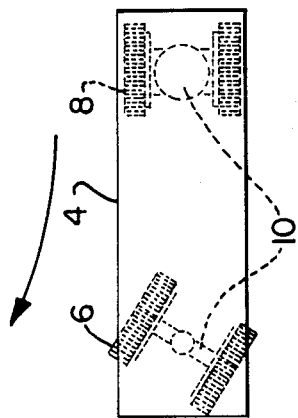
Figure 8A:
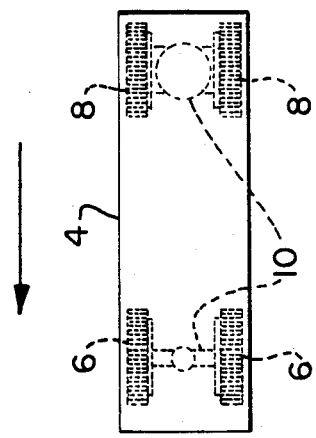

The carriage 4 may go straight ahead, back up, "crab" right or left, or turn sharply (by turning the front and rear track - carbody assemblies in opposite directions). FIGS. 8a, 8b and 8c illustrate some of these motions. As seen in FIG. 8c, for crabbing, the carbodies 10 are turned in the same direction. The carbodies 10 may be turned at 90° to the mill center-line axis for sideways movement, such as for loading or unloading the mill on trailers, railcar or barge. Since each track motor has its own rectifier 58 (FIG. 9) or generator, it is independent of the other track motors. Since independent speed control of each track is thereby possible, this allows differential speeds of outboard and inboard tracks which becomes necessary on some turns (eg. in the turn as illustrated in FIG. 8b, the inboard front track 6 will move more slowly than the outboard front track 6).

The angle of tracks 6 or 8 in relation to the mill frame can be measured and this signaled to computer 42 to control the various track speeds required to maintain a desired angle. This will allow the mill operator to indicate a turn by using steering mechanism 12. If, for example the turn is to the right, the computer 42 will cause the front left track 6 to speed up and start turning the front track and associated carbody 10 to the right (FIG. 8b). The computer will control the speed of the left track to maintain the turn as long as the operator indicates. When a turn is started a predetermined distance is measured and then the rear track can be turned in the opposite direction to match the angle of the turn of the front track. This will cause the carriage 4 to swing in a shorter radius than otherwise would be obtained. The speeds of the tracks are each controlled by computer 42 to initiate, maintain and terminate all of these actions.

In steering the carriage 4 as previously described herein, under computer control the operator manually turns the steering mechanism 12 to turn the front carbody while the computer controls the turn of the rear carbody in an opposite direction. The front end is straightened out in the new direction by running the front motors at the same speed. The computer is programmed then to align the rear carbody in the new direction automatically by returning the motor speeds to the same rpm after a programmed delay. Tachometers 65 are associated with each of the motors to give the four motors speed while the computer shows the angle of turn for each carbody. The computer 42 keeps all four motors at equal speed for straight ahead, reverse or crabbing direction.

Apparatus 2 may be set up to operate in various modes: vehicle to move only; mill to operate only - as a stationary mill; mill speed and vehicle to match ("mill match"). In the case of "mill match", the vehicle speed can be made to match the mill speed, or the mill speed can be made to match the vehicle speed. The former case will be the one used more often. The vehicle speed is preferably controlled to match the mill speed as the mill speed affects most of the other functions of the mill. The mill may be operated in a stationary mode and then changed for the vehicle to match the mill speed. When such a change occurs during operation of the mill, the change must occur without stopping of the mill operation.

Figure 10:
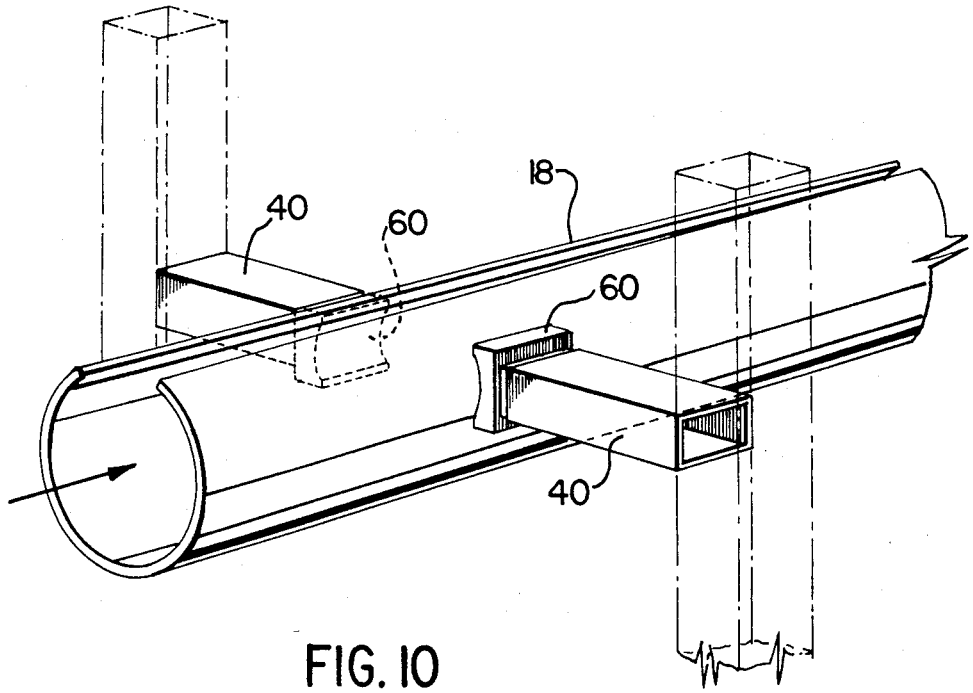
FIG. 10 is a perspective view of bearing shoes according to the present invention.

Turning to FIG. 10 there is shown a partial perspective detail of the bearing shoes 40 used according to the present invention. The shoes are laterally movable with respect to the longitudinal axis of the mill, and are provided with bearing surfaces 60, to bear against the outer surface of the cylindrical member being formed. The bearing surfaces 60 are made of an appropriate ultra high molecular plastic or other plastics such as Teflon (Trade Mark) which has a very low coefficient of friction and load carrying ability. Such shoes have proven to be effective in their operation and replace the moving belt construction, for a similar purpose, described and illustrated in my prior U.S. Pat. No. 3,145,758.

Figures 11, 12:
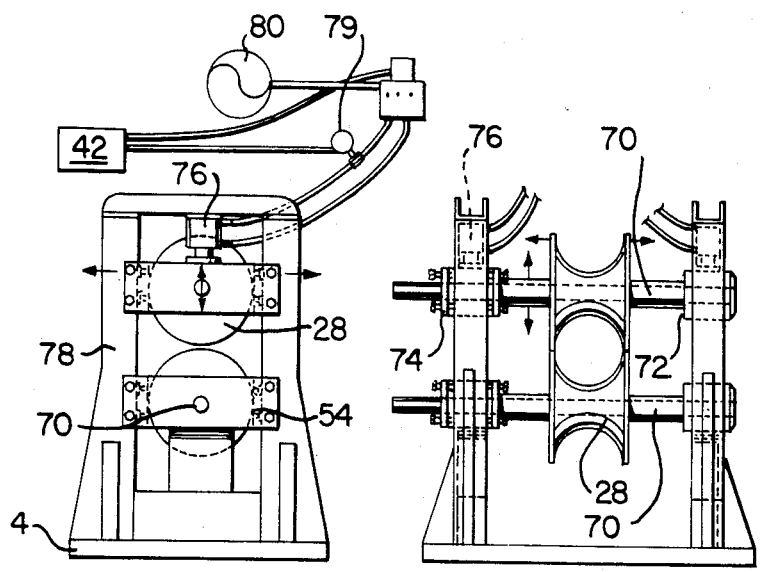
FIGS. 11 and 12 are respectively side and rear elevation views of roller bearing chocks according to the present invention.

Another aspect of the present invention lies in the improved ability to orient and align the forming rolls of apparatus 2. As can be seen in FIGS. 11 and 12 forming rolls 28 are each mounted on a shaft 70 which has bearings 72 and bearing chocks 74 at each end, the chocks being secured to roll stands 78. The bearing chocks 74 are adjusted in a vertical plane either by means of screw jacks (not shown) or hydraulic cylinders 76. In the case of hydraulic cylinders the oil pressure to each cylinder, which is situated at the ends of the shaft 76 attached to the chocks 74, is equal. Thus the force exerted by each of the rolls in a particular roll stand 78 is equal. The pressure of the hydraulic system can be measured on the hydraulic fluid. The signals from a pressure sensor 79 can be fed to computer 42, which computer also controls the operation of hydraulic pump 80. (In the case of an electric system the pressure can be measured by a load sensor and the computer can control the electric motor operating the jack screw.) The mill operator can manually set the roll pressure and then indicate to the computer than the pressure is to be maintained. Computer 42 will then adjust the pump (or motor) to maintain the pressure. Under certain cases, such as the end of a coil of metal, computer 42 can reduce the pressure as the end of the metal leaves each roll stand 78. This will ensure that a roll will be made to press directly against its opposite mate with nothing in between.

Figure 13:
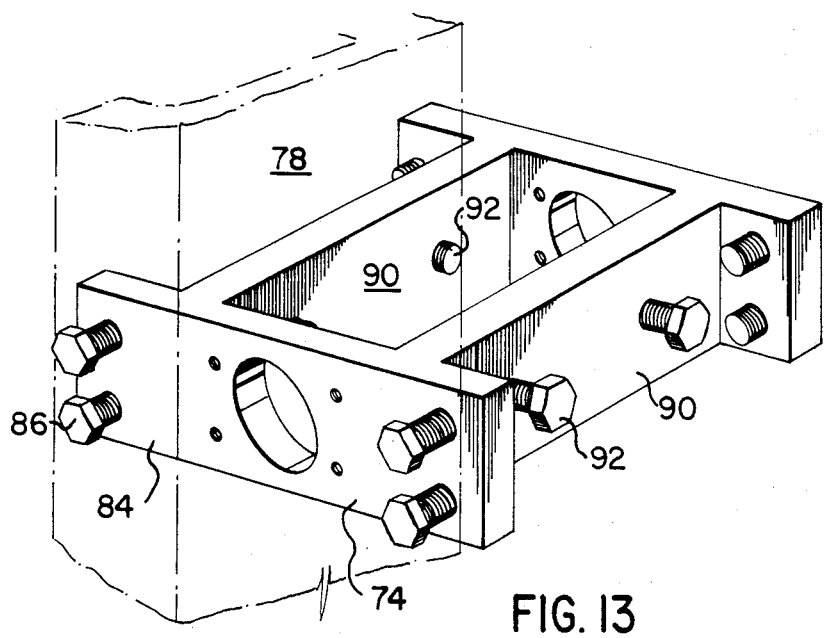
FIG. 13 is a perspective view of a roller bearing chock according to the present invention.

In addition, the bearing design of chocks 70 is such that there is a fixed bearing on the outboard chock which is free to float. This is standard mill bearing design. The inboard (or driven end) chock 74 (FIG. 13) has flanges 84 which lie above the surface of chock stands 78. In each flange 84 are mounted cap screws 86 through tapped holes in the flanges. When these cap screws are appropriately adjusted in or out, they make it possible to move the flanges laterally in relation to the stands. Since the shaft, bearings and chocks are rigidly attached together, the whole shaft moves in or out. Since the rolls are mounted on shafts 70, the center lines of the rolls may thus be moved laterally to coincide with the center line of the mill. This movement is in the horizontal plane. It is necessary to align all the rolls to the center line of the mill for uniform forming and to eliminate uneven horizontal forces which cause the pipe being formed to ripple or buckle or, if not that severe, to put undesirable retained stress in the pipe.

Further, shafts 70 may be pivoted in the horizontal plane to ensure that the shafts are parallel to each other and at right angles to the center line of the mill, so that the metal being formed will roll in the mill and not climb higher on one side than the other when it is being formed into a cylinder. As can be seen from the perspective view of a chock in FIG. 13, the sides 90 of bearing chocks 74 are tapped and provided with cap screws 92 which can bear on the sides of chock stands 78. By running the cap screws 92 in or out, the chock is moved relative to the stand in a manner which appropriately pivots the shaft at right angles to the center lines of the mill.

Thus it is apparent that there has been provided in accordance with the invention a carriage and steering system that fully satisfies the objects, aims and advantages set forth above. While the invention has been described in conjunction with a specific embodiment thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What I claim as my invention:

1. In a mobile pipe forming apparatus having in combination a carriage defining a planar supporting surface, means for propelling and means for steering the carriage, and pipe forming apparatus supported on the carriage, the pipe forming apparatus including a cradle for carrying a coil of an elongated metal strip, means for shaping the metal strip from the coil into an elongated cylindrical member with confronting, longitudinally extending edges, welding means to join the longitudinally extending edges of the cylindrical member to form a continuous pipe, and drive means to pass the strip from the coil through the shaping and welding means and pass the pipe from the pipe forming apparatus, the improvement characterized by the carriage being mounted on a forward and rearward pair of tracks, the two tracks of each pair being mounted on a rigid carbody, the carbody of the forward pair of tracks being pivotally secured to the carriage by means of a ball and socket means centered with respect to that carbody, the other carbody being secured to the carriage by means of a turntable which rotates about an axis normal to the surface of the carrriage on a centered axis pin so that, during movement, the carriage stays in a plane parallel to that of the turntable, the top half of the turntable being attached to the carriage by means of a pin parallel to the surface of the carriage and normal to the longitudinal axis of the carriage, thereby allowing the associated carbody to rock backwards and forwards as well as to rotate.

2. An apparatus according to claim 1 wherein each track is driven by a separate DC motor the speed of which and the direction of rotation of which is adjustable independent of the others.

3. An apparatus according to claim 4 wherein the speed and direction of rotation of each of the DC motors is controlled by computer means.

4. An apparatus according to claim 1 wherein the pipe forming apparatus is self contained entirely on the carriage and wherein the coil is supported at the front of the carriage.

5. An apparatus according to claim 1 wherein the means for shaping the metal strip from the coil into the elongated cylindrical member comprise a plurality of sizing and forming rolls spaced longitudinally on the carriage.

6. An apparatus according to claim 5 wherein, between the forming rolls, a plurality of shoes are provided, moveable transversely and bearing inwardly against the outer surface of the cylindrical member being formed, the bearing surfaces of the shoes being made from an ultra high molecular or other plastic having a very low coefficient of friction.

7. An apparatus according to claim 5 wherein the sizing and forming rolls are mounted on bearing chocks provided with means to vertically adjust the rolls and separate means to pivotally adjust the axis of rotation of the rolls parallel to the surface of the carriage to be normal to the longitudinal axis thereof, and to adjust the lateral positioning of the rolls with respect to the longitudinal axis of the carriage.

8. An apparatus according to claim 7 wherein the vertical adjustment of the rolls is computer controlled.

9. Apparatus according to claim 5 further provided with a Turk's head mechanism secured on the carriage near its rear, through which elongated pipe formed by the pipe forming apparatus is to pass straight or bend the pipe as it leaves the apparatus.

10. An apparatus according to claim 9 wherein the operation of the Turk's head mechanism is computer controlled.

11. In a mobile pipe forming apparatus having in combination a carriage defining a planar supporting surface, means for propelling and means for steering the carriage, and pipe forming apparatus supported on the carriage, the pipe forming apparatus including a cradle for carrying a coil of an elongated metal strip, a plurality of sizing and forming rolls spaced longitudinally of said carriage for shaping the metal strip from the coil through the shaping and welding means and pass the pipe from the pipe forming apparatus, the improvement characterized by the carriage being mounted on a forward and a rearward pair of tracks, the two tracks of each pair being mounted on a rigid carbody, the carbody of one of these pairs of tracks being pivotally secured to the carriage by means of a ball and socket means centered with respect to that carbody, the other carbody being secured to the carriage by means of a turntable which rotates about an axis normal to the surface of the carriage on a centered axis pin so that, during movement, the carriage stays on the same plane as that of the turntable and a plurality of shoes between said forming rolls, said shoes being movable transversely and bearing inwardly against the outer surface of the cylindrical member being formed, the bearing surfaces of said shoes being made from an ultra high molecular or other plastic having a very low coefficient of friction.

12. In a mobile pipe forming apparatus having in combination a carriage defining a planar supporting surface, means for propelling and means for steering the carriage, and pipe forming apparatus supported on the carriage, the pipe forming apparatus including a cradle for carrying a coil of an elongated metal strip, a plurality of sizing and forming rolls spaced longitudinally of said carriage for shaping the metal strip from the coil into an elongated cylindrical member with confronting, longitudinally extending edges, welding means to join the longitudinally extending edges of the cylindrical member to form a continuous pipe, and drive means to pass the strip from the coil through the shaping and welding means and pass the pipe from the pipe forming apparatus, the improvement characterized by the carriage being mounted on a forward and a rearward pair of tracks, the two tracks of each pair being mounted on a rigid carbody, the carbody of one of these pairs of tracks being pivotally secured to the carriage by means of a turntable which rotates about an axis normal to the surface of the carriage on a centered axis pin so that, during movement, the carriage stays on the same plane as that of the turntable and bearing chocks mounting said sizing and forming rolls, said chocks including means to vertically adjust said rolls and separate means to pivotally adjust the axis of rotation of said rolls parallel to the surface of the carriage to be normal to the longitudinal axis thereof and to adjust the lateral positioning of said rolls with respect to the longitudinal axis of the carriage.

13. An apparatus according to claim 14 wherein the vertical adjustment of the rolls is computer controlled.

* * * * *